(12) United States Patent
Jung

(10) Patent No.: US 9,670,850 B2
(45) Date of Patent: Jun. 6, 2017

(54) COMBUSTION-NOISE CONTROLLING METHOD FOR DIESEL ENGINE

(71) Applicant: HYUNDAI MOTOR COMPANY, Seoul (KR)

(72) Inventor: In Soo Jung, Suwon-si (KR)

(73) Assignee: HYUNDAI MOTOR COMPANY, Seoul (KR)

( * ) Notice: Subject to any disclaimer, the term of this patent is extended or adjusted under 35 U.S.C. 154(b) by 214 days.

(21) Appl. No.: 14/682,912

(22) Filed: Apr. 9, 2015

(65) Prior Publication Data

US 2016/0146125 A1 May 26, 2016

(30) Foreign Application Priority Data

Nov. 25, 2014 (KR) .......................... 10-2014-0165285

(51) Int. Cl.
| | |
|---|---|
| *F02D 35/02* | (2006.01) |
| *F02D 41/14* | (2006.01) |
| *F02D 41/30* | (2006.01) |
| *F02D 41/22* | (2006.01) |
| *F02D 41/40* | (2006.01) |

(52) U.S. Cl.
CPC ........... *F02D 35/027* (2013.01); *F02D 41/22* (2013.01); *F02D 41/403* (2013.01); *Y02T 10/44* (2013.01)

(58) Field of Classification Search
CPC ...... F02D 35/027; F02D 41/22; F02D 41/403; Y02T 10/44
USPC .......................................... 123/478; 701/103
See application file for complete search history.

(56) References Cited

U.S. PATENT DOCUMENTS

| | | | | |
|---|---|---|---|---|
| 2005/0005902 | A1* | 1/2005 | Vermonet | ............. F02D 41/403 123/299 |
| 2005/0224044 | A1* | 10/2005 | Stojkovic | .............. F02D 41/405 123/299 |

(Continued)

FOREIGN PATENT DOCUMENTS

| | | |
|---|---|---|
| JP | H07-012002 A | 1/1995 |
| JP | 2000-205022 A | 7/2000 |

(Continued)

OTHER PUBLICATIONS

Korean Office Action dated Dec. 18, 2015 issued in Korean Patent Application No. 10-2014-0165285.

*Primary Examiner* — Hieu T Vo
*Assistant Examiner* — Arnold Castro
(74) *Attorney, Agent, or Firm* — McDermott Will & Emery LLP

(57) ABSTRACT

A combustion-noise controlling method for a diesel engine includes: setting a target value for a vibration peak using one or more control variables needed for driving a vehicle, diagnosing a combustion noise of the engine based on the target value, and checking whether the diagnostic value for the combustion noise is higher than a reference value previously input to a controller. Combustion is performed depending on a result of the checking. A vibration signal of the engine is measured, and a vibration peak value depending on the measured vibration signal is obtained. A feedback control step includes obtaining a correction value by performing an arithmetic operation using the target value and the vibration peak value. A pilot fuel quantity is controlled according to the correction value.

10 Claims, 3 Drawing Sheets

(56) References Cited

U.S. PATENT DOCUMENTS

| | | | | |
|---|---|---|---|---|
| 2008/0190185 | A1* | 8/2008 | Zimmer | F02D 35/02 73/114.07 |
| 2011/0276251 | A1* | 11/2011 | Kang | B60K 6/48 701/103 |
| 2012/0004826 | A1* | 1/2012 | Shimo | F02D 41/3035 701/103 |
| 2012/0048234 | A1* | 3/2012 | Hamama | F02D 41/0025 123/436 |
| 2014/0012487 | A1* | 1/2014 | Jung | F02D 41/30 701/104 |
| 2014/0041439 | A1* | 2/2014 | Matsushima | G01L 23/221 73/35.09 |
| 2014/0172276 | A1* | 6/2014 | Jung | F02D 41/403 701/104 |
| 2016/0108848 | A1* | 4/2016 | Jung | F02D 41/403 123/299 |

FOREIGN PATENT DOCUMENTS

| | | |
|---|---|---|
| JP | 2012-154244 A | 8/2012 |
| KR | 10-2012-0008668 A | 2/2012 |
| KR | 10-2012-0028113 A | 3/2012 |
| KR | 10-2014-0005403 A | 1/2014 |

* cited by examiner

COMBUSTION-NOISE CONTROLLING METHOD FOR DIESEL ENGINE

CROSS REFERENCE TO RELATED APPLICATION

The present application claims the benefit of priority to Korean Patent Application Number 10-2014-0165285 filed on Nov. 25, 2014, the entire contents of which application are incorporated herein for all purposes by this reference.

TECHNICAL FIELD

The present invention relates generally to a combustion noise controlling method for a diesel engine, which prevents abnormal combustion noise.

BACKGROUND

Usually, a diesel vehicle emits more exhaust gas in comparison to a gasoline vehicle. Also, a diesel vehicle is noisy and tends to vibrate more. Accordingly, the diesel engine is equipped with a Diesel Particulate Filter (DPF) to reduce the exhaust gas, and introduces multi-pilot injection to reduce noise and vibration. In addition, various means for improving the combustion process are being introduced in the diesel vehicle.

Specifically, to reduce combustion noise of the diesel vehicle, hardware aspects of the vehicle such as hardness of the vehicle, shielding, and sound-absorbing materials have been improved in recent years. Also, in terms of software, fuel injection factors such as an injection pressure, injection timing, a fuel amount, and the like, are determined depending on engine rpm and loads, and these fuel injection factors are corrected depending on environmental variables (for example, ambient temperature, atmospheric pressure, and coolant temperature). Then, the fuel injection is carried out according to the fuel injection factors. Additionally, to reduce combustion noise, a combustion pressure rise rate is decreased by increasing the number of pilot fuel injections. The pilot injection involves creating a combustion condition (increasing the temperature of a combustion chamber to mix fuel and air well) before a main fuel injection, and may reduce ignition delay and decrease the combustion fuel pressure rise that is caused by the main fuel injection.

Also, in case of the diesel engine, coking may occur. That is, due to aging of an injection quantity adaptation injector, a fuel injecting hole becomes clogged by exhaust gas. Accordingly, in response to the same commands of an ECU, the quantity of injected fuel is actually smaller than before and thus an abnormal combustion noise (engine knocking noise) occurs. Consequently, in the case where a pilot fuel quantity is small, a technique for increasing the pilot fuel quantity is necessary.

The foregoing is intended merely to aid in the understanding of the background of the present invention, and is not intended to mean that the present invention falls within the purview of the related art that is already known to those skilled in the art.

Documents of Related Art

SUMMARY

A combustion noise controlling method for a diesel engine may include: a target value setting step of setting a target value for a vibration peak using, as input, one or more control variables needed for driving a vehicle; a diagnosing step for diagnosing a combustion noise of an engine based on the target value and generating a diagnostic value for the diagnosed combustion noise; a comparing step of checking whether the diagnostic value for the diagnosed combustion noise is higher than a reference value that has been previously input to a controller; a combustion step of performing a combustion process based on a result of the comparing step; a vibration peak obtaining step of measuring a vibration signal of the engine and obtaining a vibration peak value based on the measured vibration signal; and a feedback control step of obtaining a correction value by an arithmetic operation using the target value and the vibration peak value, and controlling a pilot fuel quantity according to the correction value.

In the target value setting step, the control variables may include at least one selected from a group consisting of a fuel amount, an engine rpm, a gear level, an air temperature, and a coolant temperature.

In certain embodiments, if the diagnostic value for the diagnosed combustion noise is the same as or higher than the reference value that has been previously input to the controller, the method may further include increasing the pilot fuel quantity by controlling an injection variable related to injection in the controller. In this case, the combustion step may be performed after the step of increasing the pilot fuel quantity.

In certain embodiments, the combustion process may be performed if the diagnostic value for the diagnosed combustion noise is lower than the reference value that has been previously input to the controller.

In certain embodiments, in the vibration peak obtaining step, the vibration signal of the engine may be measured by an accelerometer mounted on a cylinder block of the engine.

In certain embodiments, the vibration peak obtaining step may include determining the difference between adjacent local peaks in the measured vibration signal, and setting as the vibration peak value the local peak having the greatest difference from an adjacent lower peak.

In certain embodiments, the vibration peak obtaining step may further include collecting vibration signals within a frequency range for determining an abnormal combustion noise, which corresponds to criteria that has been previously input to the controller.

In certain embodiments, the vibration peak obtaining step may further include converting a vibration signal using wavelet transform.

In certain embodiments, the feedback control step is iteratively performed, and the correction value is used as a new target value.

BRIEF DESCRIPTION OF THE DRAWINGS

The above and other objects, features and other advantages of the present inventive concept will be more clearly understood from the following detailed description taken in conjunction with the accompanying drawings, in which.

DETAILED DESCRIPTION

Hereinafter, a combustion noise controlling method for a diesel engine according to exemplary embodiments of the present inventive concept will be described in detail referring to accompanying drawings.

Figure 1:
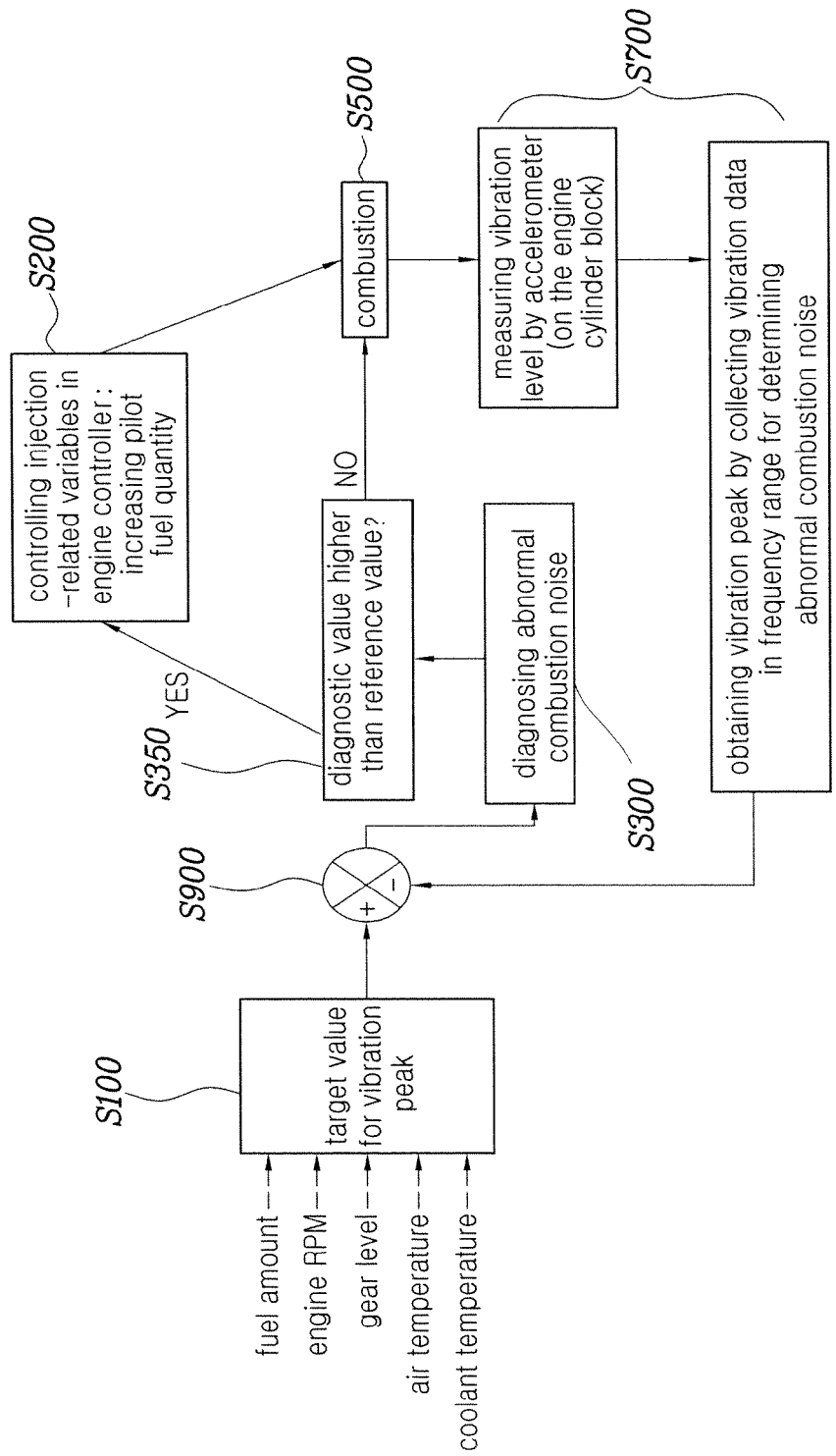
FIG. 1 is a block diagram illustrating a combustion noise controlling method for a diesel engine according to an embodiment of the present inventive concept.
Figure 2:
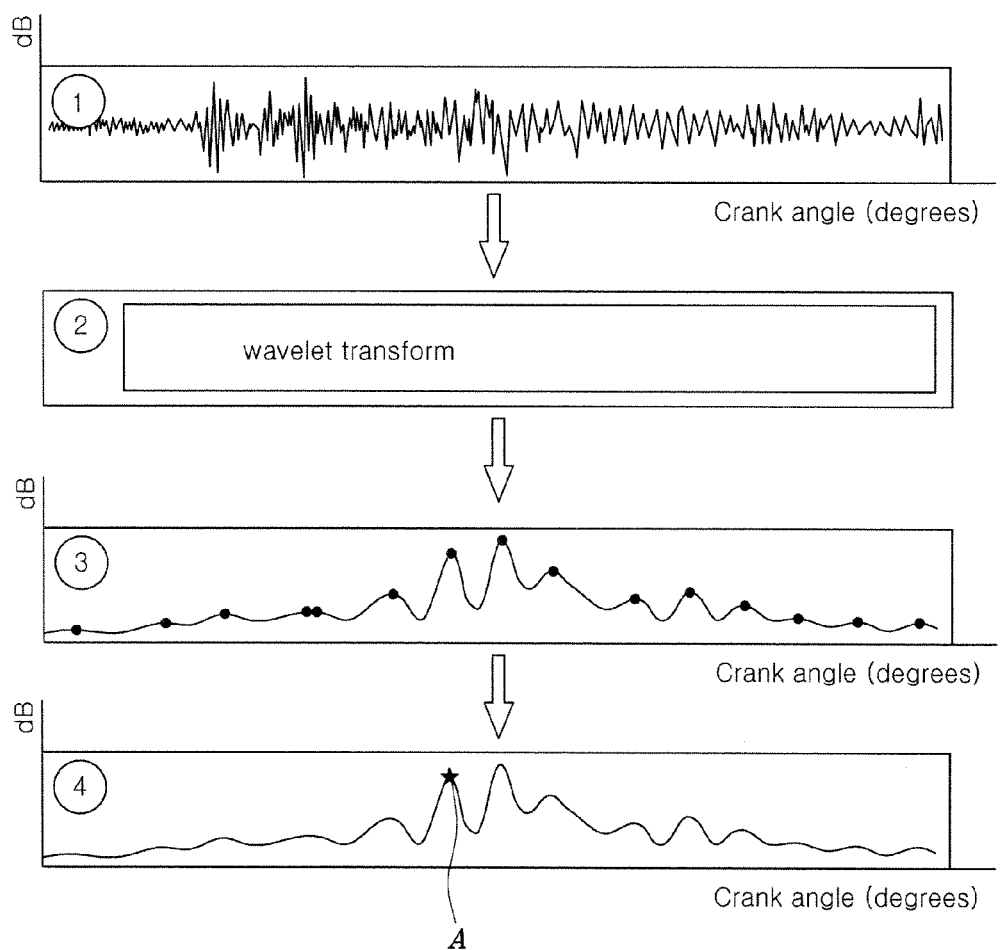
FIG. 2 is a view illustrating a process of obtaining a peak value by converting a vibration signal in a vibration peak obtaining step.
Figure 3:
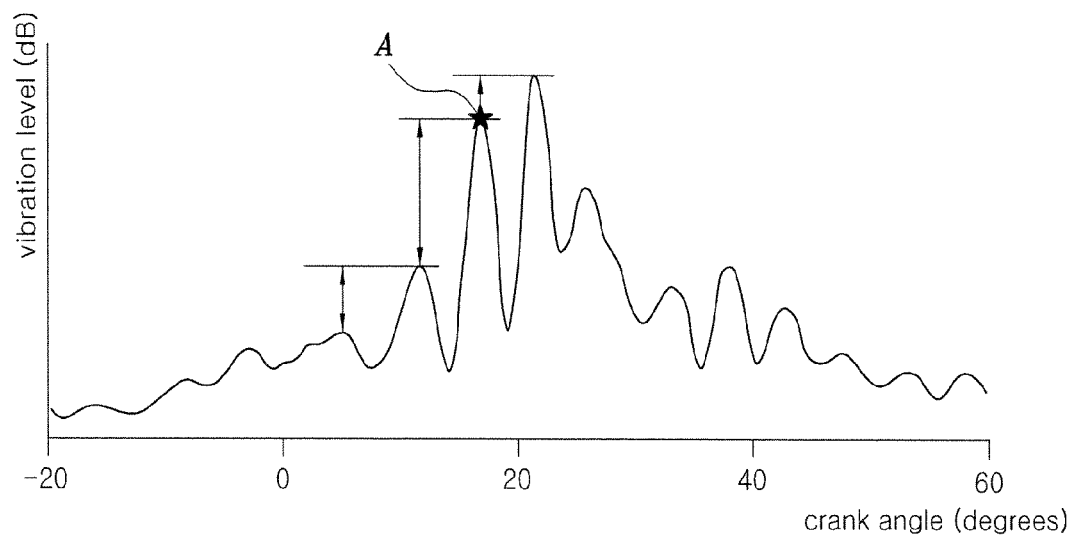
FIG. 3 is a view illustrating a method of selecting a peak value.

FIG. 1 is a block diagram illustrating a combustion noise controlling method for a diesel engine according to an embodiment of the present inventive concept, and FIG. 2 is a view illustrating a process of obtaining a peak value by converting a vibration signal in a vibration peak obtaining step (S700). FIG. 3 is a view illustrating a method of selecting a peak value.

A combustion noise controlling method for a diesel engine according to an embodiment of the present inventive concept includes: a target value setting step (S100) of setting a target value for a vibration peak by using, as inputs, control variables needed for driving a vehicle; a diagnosing step (S300) of diagnosing combustion noise of the engine depending on the target value input from the target value setting step (S100); for a comparing step (S350) of checking whether the diagnostic value for the combustion noise is higher than a reference value that has been previously input to a controller; a combustion step (S500) for performing combustion depending on the result of the comparing step (350); a vibration peak obtaining step (S700) for measuring a vibration signal of the engine and obtaining a vibration peak value depending on the measured vibration signal; and a feedback control step (S900) of obtaining a correction value by an arithmetic operation between the target value input from the target value setting step (S100) and the vibration peak value obtained by the vibration peak obtaining step (S700) and controlling a pilot fuel quantity according to the correction value.

An embodiment of the present inventive concept involves a diagnostic method for determining an abnormal condition depending on a vibration level measured by an accelerometer mounted on a cylinder block of an engine, the vibration level being measured within a frequency range determined through tests for both normal and abnormal conditions according to engine rpm or load areas. An embodiment of the present inventive concept includes a feedback control system that additionally injects a pilot fuel quantity and then performs a combustion process, when the diagnostic value of a combustion noise is higher than a reference value input to the controller.

FIG. 1 is a block diagram of a combustion noise controlling method for a diesel engine, and the present invention will be described in detail referring to the drawing.

First, the controller carries out a target value setting step (S100), which receives, as inputs, one or more respective control variables for driving a vehicle, and sets a target value for a vibration peak value. The target value set in the target value setting step (S100) is specifically a target value according to a fuel amount and engine rpm. Also, the control variables input in the target value setting step (S100) may include a fuel amount, engine rpm, a gear level, an air temperature, a coolant temperature, and the like. Because there is no feedback while the control process is first executed, the target value is input to a feedback system.

After the target value setting step (S100) is performed, the diagnosing step (S300) is carried out, which diagnoses combustion noise of the engine depending on the target value.

The comparing step (S350) involves checking whether a diagnostic value for the diagnosed combustion noise is higher than a reference value that is previously input to the controller. Then, combustion step (S500) is performed based on a result of the comparing step (S350). In certain embodiments, when the diagnostic value for the combustion noise is higher than the reference value, an injection quantity increasing step (S200), which increases a pilot fuel quantity by controlling an injection variable related to injection in the controller, is performed before the combustion step (S500). In certain embodiments, if the diagnostic value for the combustion noise is lower than the reference value, the combustion step (S500) is performed immediately after the comparing step (S350).

After that, a vibration peak obtaining step (S700) is performed, in which a vibration signal of the engine is measured and a vibration peak value is obtained based on the measured data. In certain embodiments, in the vibration peak obtaining step (S700), the vibration signal of the engine is measured by an accelerometer mounted on a cylinder block of the engine, and the vibration signal is converted using wavelet transform. The process that converts the vibration signal to obtain the peak value is illustrated in FIG. 2. Referring to FIG. 2, the vibration signal (1) measured by the accelerometer mounted on the cylinder block of the engine is converted using wavelet transform (2), and the vibration signal within a frequency range for determining an abnormal combustion noise, which corresponds to the reference previously input to the controller, is collected by average target sampling (3). Accordingly, a frequency having multiple local peaks is obtained (4). As shown in FIG. 3, the differences between adjacent local peaks are measured, and the local peak having the greatest difference from an adjacent lower peak, is determined as the peak value (A).

When the peak value has been obtained in the vibration peak obtaining step (S700), one loop of the feedback control system is completed. The feedback control system corrects the target value every time the loop is executed. The first time the feedback control step (s900) is performed, a correction value is obtained through an arithmetic operation using the target value input from the target value setting step (S100) and the peak value obtained by the vibration peak obtaining step (S700). In the feedback control step (S900), the correction value is input to the system to control a pilot fuel quantity using the correction value. The correction value obtained in the feedback control step (S900) then is used as a new target value, and the diagnosing step (S300), the comparing step (S350), the combustion step (S500), and the vibration peak obtaining step (S700) are repeated based on the new target value. In the vibration peak obtaining step (S700), a new peak value is obtained using the new target value (i.e. the correction value). Then, the feedback control step (S900) is once again performed to obtain a new correction value through the arithmetic operation between the new target value (i.e. the previous correction value) and the new peak value. The process is then repeated using the new correction value. Thus, feedback control is iteratively performed to continuously correct the target value.

In certain embodiments, when using the above described controlling method, the noise level from the pilot fuel injection is 146.9 dB. This noise level is obtained when using a single pilot injection, and when using a double pilot injection, the noise level is decreased to 144.8 dB. However, when not using pilot fuel injection, the noise level increases to 154.0 dB, that is, the noise level increases compared to when using pilot fuel injection.

Consequently, in certain embodiments, the combustion noise controlling method for a diesel engine as described above may increase a pilot fuel quantity through the process of: establishing a method for analyzing a vibration peak; introducing diagnostic criteria for an abnormal combustion noise (engine knocking noise); setting a vibration frequency range; and setting feedback control factors. Consequently, certain embodiments of the method may prevent the abnormal combustion noise that occurs when a quantity of injected fuel is smaller than before due to injector aging or because a fuel injecting hole of the injector is clogged by exhaust gas.

In certain embodiments, despite mechanical problems such as aging of the injector, clogging of the injecting hole due to exhaust gas, and the like, the amount of fuel injected during the pilot fuel injection is maintained at a similar level with the amount injected when a vehicle came out of the factory, whereby the method prevents the occurrence of abnormal combustion noise when operating the engine. Also, it is possible to secure unique technology for controlling the combustion noise.

Although embodiments of the present inventive concept have been disclosed for illustrative purposes, those skilled in the art will appreciate that various modifications, additions and substitutions are possible, without departing from the scope and spirit of the inventive concept as disclosed in the accompanying claims.

What is claimed is:

1. A combustion-noise controlling method for a diesel engine, comprising:
    a target value setting step of setting a target value for a vibration peak using, as input, one or more control variables needed for driving a vehicle;
    a diagnosing step of diagnosing a combustion noise of the engine based on the target value and generating a diagnostic value for the diagnosed combustion noise;
    a comparing step of checking whether the diagnostic value for the diagnosed combustion noise is higher than a reference value that has been previously input to a controller;
    a combustion step of performing a combustion process depending on a result of the comparing step;
    a vibration peak obtaining step of measuring a vibration signal of the engine and obtaining a vibration peak value based on the measured vibration signal; and
    a feedback control step of obtaining a correction value by performing an arithmetic operation using the target value and the vibration peak value, and controlling a pilot fuel quantity according to the correction value.

2. The method of claim 1, wherein in the target value setting step, the control variables include at least one selected from a group consisting of fuel amount, engine rpm, gear level, air temperature, and coolant temperature.

3. The method of claim 1, wherein the control variables include a fuel amount and an engine rpm.

4. The method of claim 1, further comprising:
    if the diagnostic value for the diagnosed combustion noise is the same as or higher than the reference value that has been previously input to the controller, increasing the pilot fuel quantity by controlling an injection variable related to injection in the controller,
    wherein the combustion step is performed after the step of increasing the pilot fuel quantity.

5. The method of claim 1, wherein the combustion process is performed if the diagnostic value for the diagnosed combustion noise is lower than the reference value that has been previously input to the controller.

6. The method of claim 1, wherein in the vibration peak obtaining step, the vibration signal of the engine is measured by an accelerometer mounted on a cylinder block of the engine.

7. The method of claim 1, wherein in the vibration peak obtaining step, the obtaining includes determining the difference between adjacent local peaks in the measured vibration signal, and setting as the vibration peak value the local peak having the greatest difference from an adjacent lower peak.

8. The method of claim 1, wherein in the vibration peak obtaining step, the obtaining includes collecting vibration signals within a frequency range for determining an abnormal combustion noise, which corresponds to criteria that has been previously input to the controller.

9. The method of claim 1, wherein in the vibration peak obtaining step, the obtaining includes converting the vibration signal using wavelet transform.

10. The method of claim 1, further comprising:
    iteratively performing the feedback control step, wherein the correction value is used as a new target value.

* * * * *